(12) United States Patent
Turuvekere Gurudatt et al.

(10) Patent No.: US 10,968,789 B2
(45) Date of Patent: Apr. 6, 2021

(54) METHOD AND SYSTEMS FOR A VALVE BRIDGE FOR AN ENGINE

(71) Applicant: Transportation IP Holdings, LLC, Norwalk, CT (US)

(72) Inventors: Praveen Turuvekere Gurudatt, Bangalore (IN); Sandeep Kamble, Bangalore (IN); Jason Lymangrover, Harborcreek, PA (US); Sudeep Pradhan, Bangalore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/234,323

(22) Filed: Dec. 27, 2018

(65) Prior Publication Data

US 2020/0208543 A1    Jul. 2, 2020

(51) Int. Cl.
*F01L 1/26*   (2006.01)
*F01M 9/10*   (2006.01)
*B33Y 80/00*  (2015.01)

(52) U.S. Cl.
CPC ............. F01L 1/26 (2013.01); F01M 9/105 (2013.01); *B33Y 80/00* (2014.12)

(58) Field of Classification Search
CPC . F01L 1/26; F01L 1/181; F01L 13/065; F01L 13/06; F01L 1/18; F01L 1/267; F02D 13/04; F01M 9/105; B61C 5/02; B61C 5/04; B33Y 80/00

USPC ....... 123/90.22, 90.12, 90.4, 90.39
See application file for complete search history.

(56) References Cited

U.S. PATENT DOCUMENTS

| 8,210,144 B2 | 7/2012 | Langewisch | |
|---|---|---|---|
| D839,310 S | 1/2019 | Alessandria | |
| 2015/0101555 A1* | 4/2015 | Rudolph | F01L 1/26 123/90.22 |
| 2016/0084118 A1* | 3/2016 | Nichols | F01L 1/26 123/90.36 |

FOREIGN PATENT DOCUMENTS

| DE | 4440289 A1 * | 5/1996 | ............. F01L 13/06 |
|---|---|---|---|
| EP | 0503145 A1 * | 9/1992 | ................ F01L 1/26 |

OTHER PUBLICATIONS

EP-0503145 English Language Machine Translation.*

* cited by examiner

*Primary Examiner* — Patrick Hamo
*Assistant Examiner* — Wesley G Harris
(74) *Attorney, Agent, or Firm* — McCoy Russell LLP

(57) ABSTRACT

Methods and systems are provided for a valve bridge of an internal combustion engine. In one example, a valve bridge comprises a first arm, a longitudinally opposing second arm, and one or more interior walls forming a passage extending laterally through at least a portion of the valve bridge, the passage disposed between the first arm and second arm and forming a first main opening and an opposing, second main opening. A central support structure is disposed within the passage and is formed by the one or more interior walls.

19 Claims, 11 Drawing Sheets

METHOD AND SYSTEMS FOR A VALVE BRIDGE FOR AN ENGINE

FIELD

The present description relates generally to methods and systems for a valve bridge of an engine of a motorized vehicle, such as a locomotive.

BACKGROUND/SUMMARY

Internal combustion engines often include multiple intake air valves and exhaust gas valves configured to flow gases into and out of one or more combustion chambers. A single combustion chamber of an engine may receive intake gases via a corresponding pair of intake valves and/or may exhaust combustion gases via a corresponding pair of exhaust valves. Pairs of intake valves and/or exhaust valves may be linked together via corresponding valve bridges such that the valves of each pair may be synchronously opened and/or closed.

During operation of an engine, a valve bridge may frequently be subjected to various forces during opening and closing of the corresponding valves coupled to the valve bridge. The valve bridge is often in motion and contributes to an overall load of the engine. Due to the high number of opening and closing cycles of the valves, the valve bridge may have an increased likelihood of wear relative to other engine components that are less prone to frequent movements. In some embodiments, the valve bridge may be configured to include replaceable components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 10A-10C show first, second, and third side cross-sectional views of the valve bridge of FIGS. 4-9.

FIGS. 4-10C are shown to scale, although other relative dimensions may be used, if desired.

DETAILED DESCRIPTION

The following description relates to various embodiments of a valve bridge of an internal combustion engine. In one example, a valve bridge comprises: a first arm and a longitudinally opposing second arm; one or more interior walls forming a passage extending laterally through at least a portion of the valve bridge, the passage disposed between the first arm and second arm and forming a first main opening and an opposing, second main opening; and a central support structure disposed within the passage and formed by the one or more interior walls.

As described above, during operation of an engine, a valve bridge may frequently be subjected to various forces during opening and closing of the corresponding valves coupled to the valve bridge. The valve bridge is often in motion and contributes to an overall load of the engine. Due to the high number of opening and closing cycles of the valves, the valve bridge may have an increased likelihood of wear relative to other engine components that are less prone to frequent movements. In some embodiments, the valve bridge may be configured to include replaceable components.

However, forming the valve bridge from multiple components may increase a likelihood of wear of the individual components on each other and may increase a maintenance frequency of the valve bridge. Further, such a configuration may increase a cost and/or weight of the valve bridge due to the multitude of components.

In one example, the issues described above may be addressed by the valve bridge described herein. As one example, the valve bridge may be formed as a single, unitary piece via an additive manufacturing process, such as 3D printing. Forming the valve bridge as a single, unitary piece may reduce a likelihood of wear of the valve bridge and/or maintenance frequency of the valve bridge due to the reduced number of separate components of the valve bridge compared to conventional valve bridges. Further, the valve bridge may be formed with a variety of spaces, orifices, and interior walls that may otherwise be difficult to achieve via conventional manufacturing processes (e.g., molding, machining, etc.), which may reduce a cost and/or production time of the valve bridge. The valve bridge may be included within an engine system such as a locomotive engine system, as described below.

Figure 1:
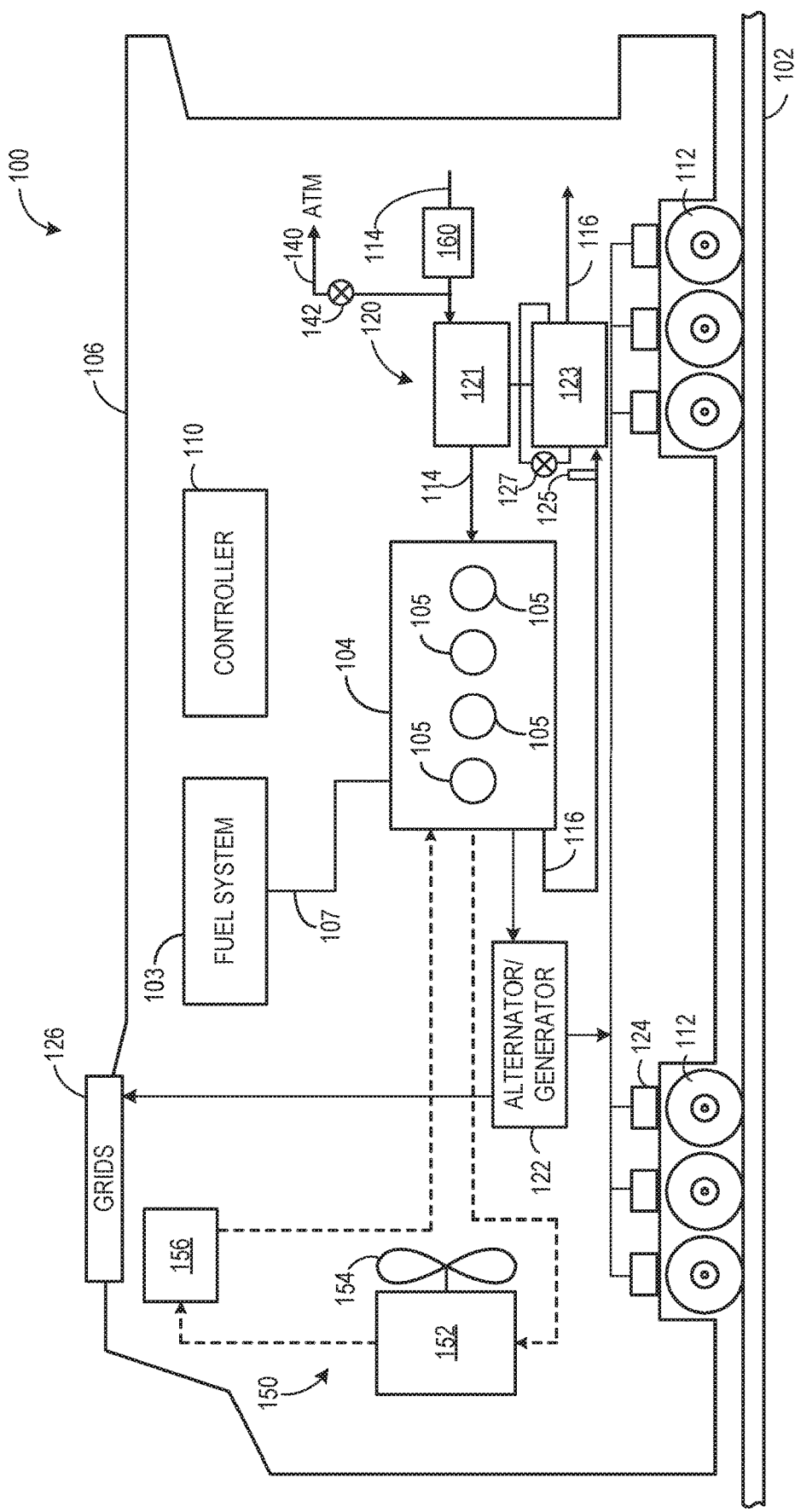
FIG. 1 shows a schematic diagram of a vehicle including an engine and a fuel injection system, according to an embodiment of the invention.
Figure 2:
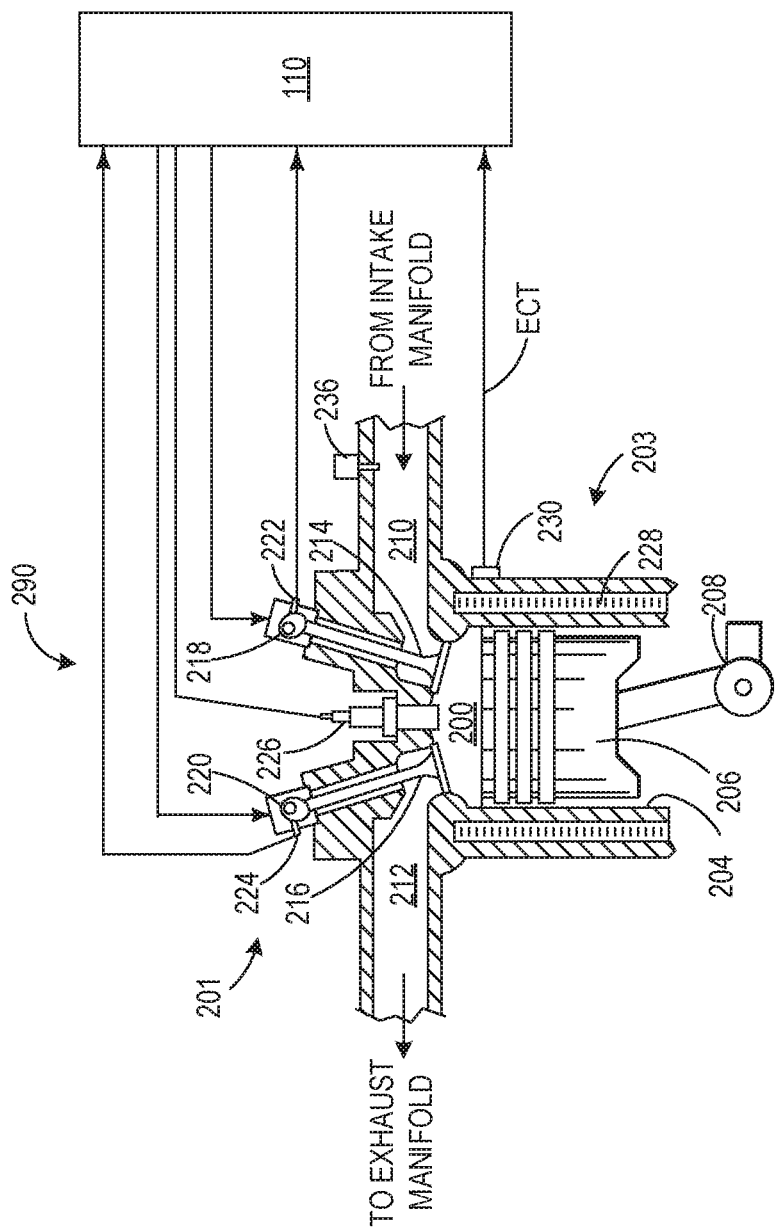
FIG. 2 shows a schematic diagram of an example cylinder of an engine and a fuel injection system, according to an embodiment of the invention.
Figure 9:
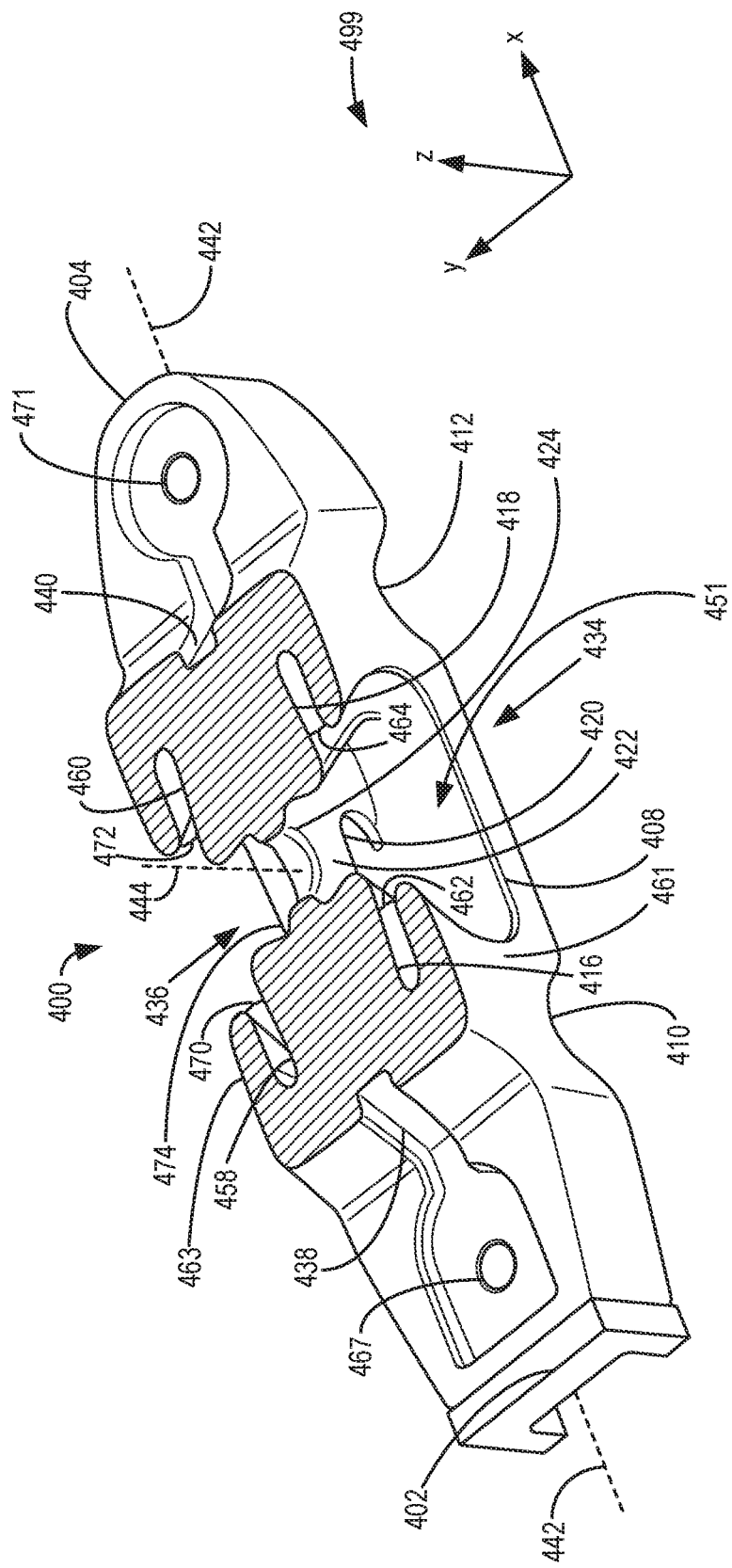
FIG. 9 shows a top cross-sectional view of the valve bridge of FIGS. 4-8B.
Figure 10:
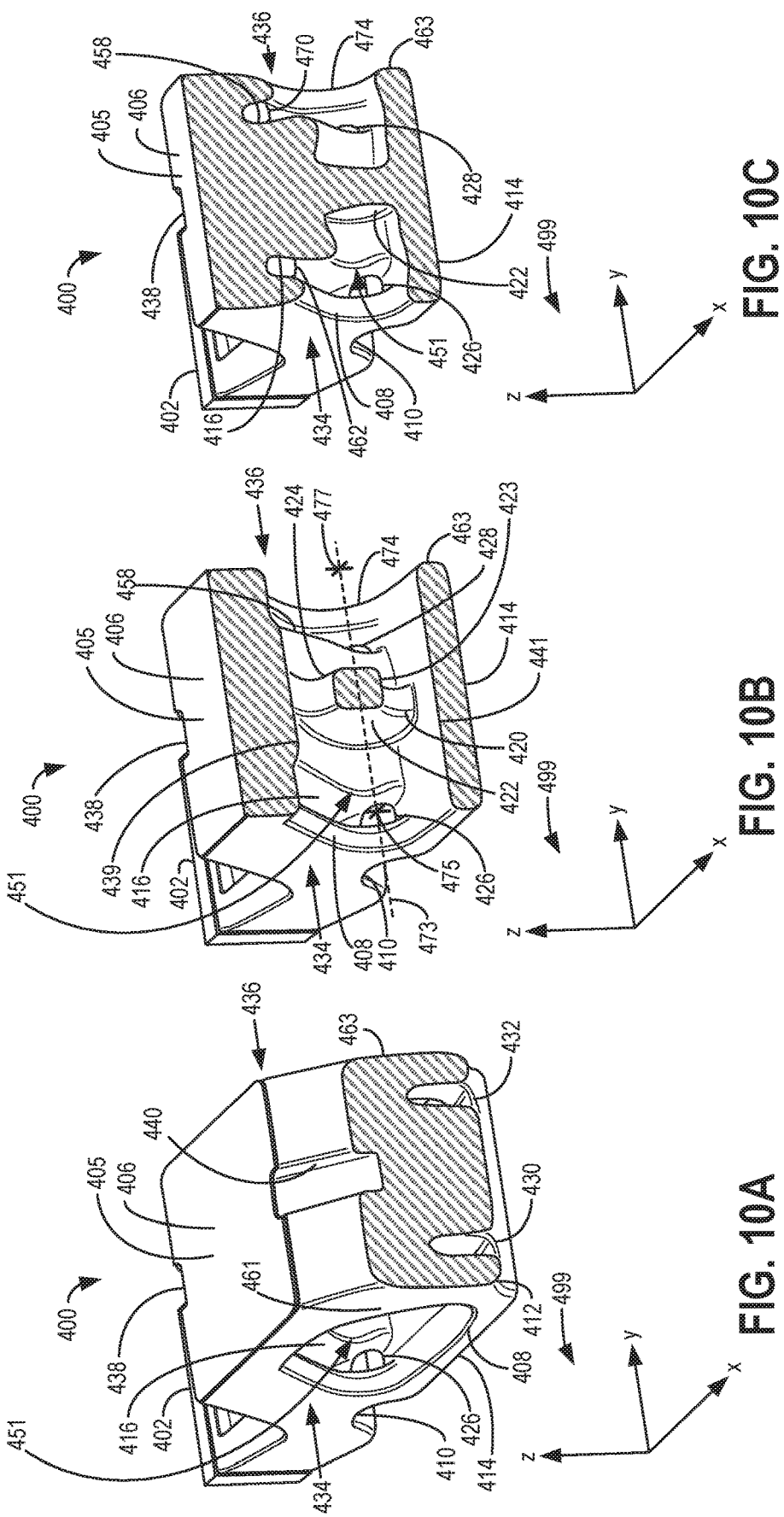
Figure 11:
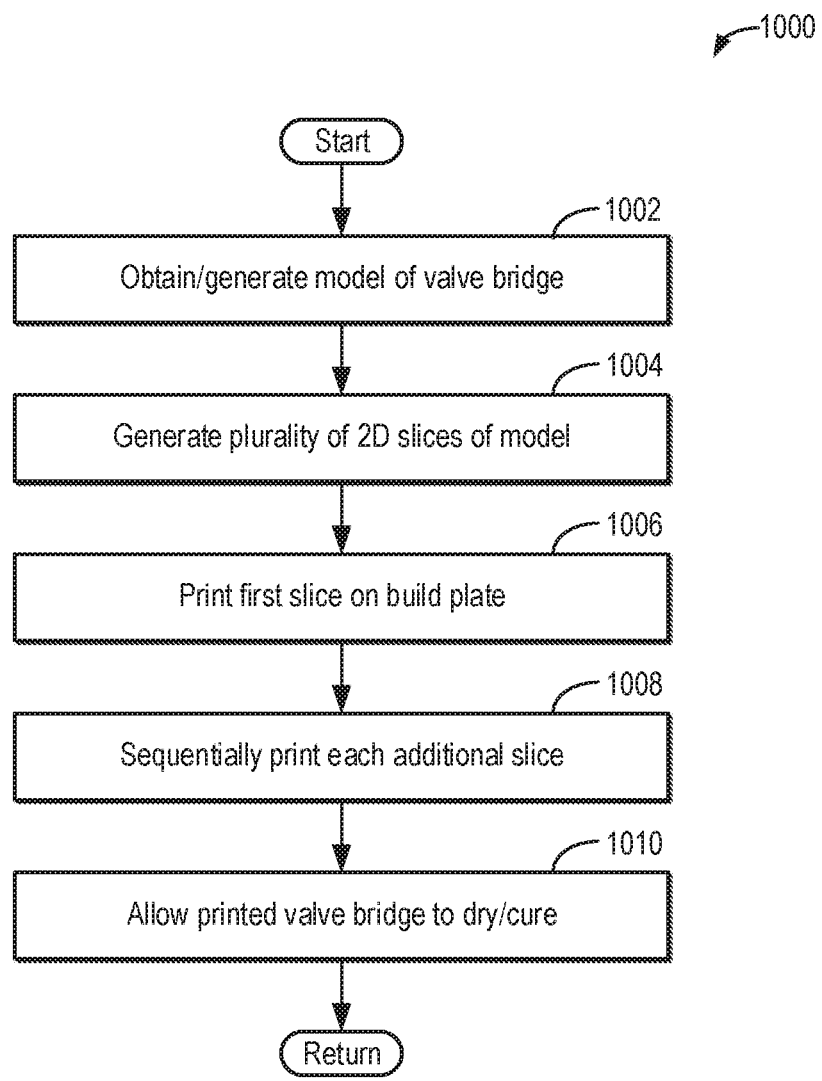
FIG. 11 shows a flowchart illustrating a method for manufacturing a valve bridge via an additive manufacturing process.

A vehicle, such as the vehicle shown by FIG. 1, may include an engine having a plurality of combustion chambers, such as the combustion chamber shown by FIG. 2, for combusting a mixture of fuel and air. Each combustion chamber may be coupled with valves of a valve train system, such as the valve train system of FIG. 3. At least one combustion chamber may be coupled to a pair of intake valves or exhaust valves coupled to a respective valve bridge of the valve train system. The valve bridge, such as the valve bridge shown by FIGS. 4-10C, is formed as a single, unitary piece. The valve bridge includes a passage extending laterally through the valve bridge, as shown by FIGS. 4-10C. A central support is disposed within the passage and is joined to interior walls of the passage, as shown by FIGS. 9 and 10C. In some examples, the valve bridge may be formed via an additive manufacturing process such as 3D printing, as illustrated by the flowchart of FIG. 11. By forming the valve bridge with the passage and the central support, a weight of the valve bridge may be reduced, and a rigidity of the valve bridge may be increased. The reduced weight of the valve bridge may result in a decreased load on the engine during conditions in which the engine is in operation, and the increased rigidity of the valve bridge may reduce a likelihood of wear of the valve bridge.

Figure 3:
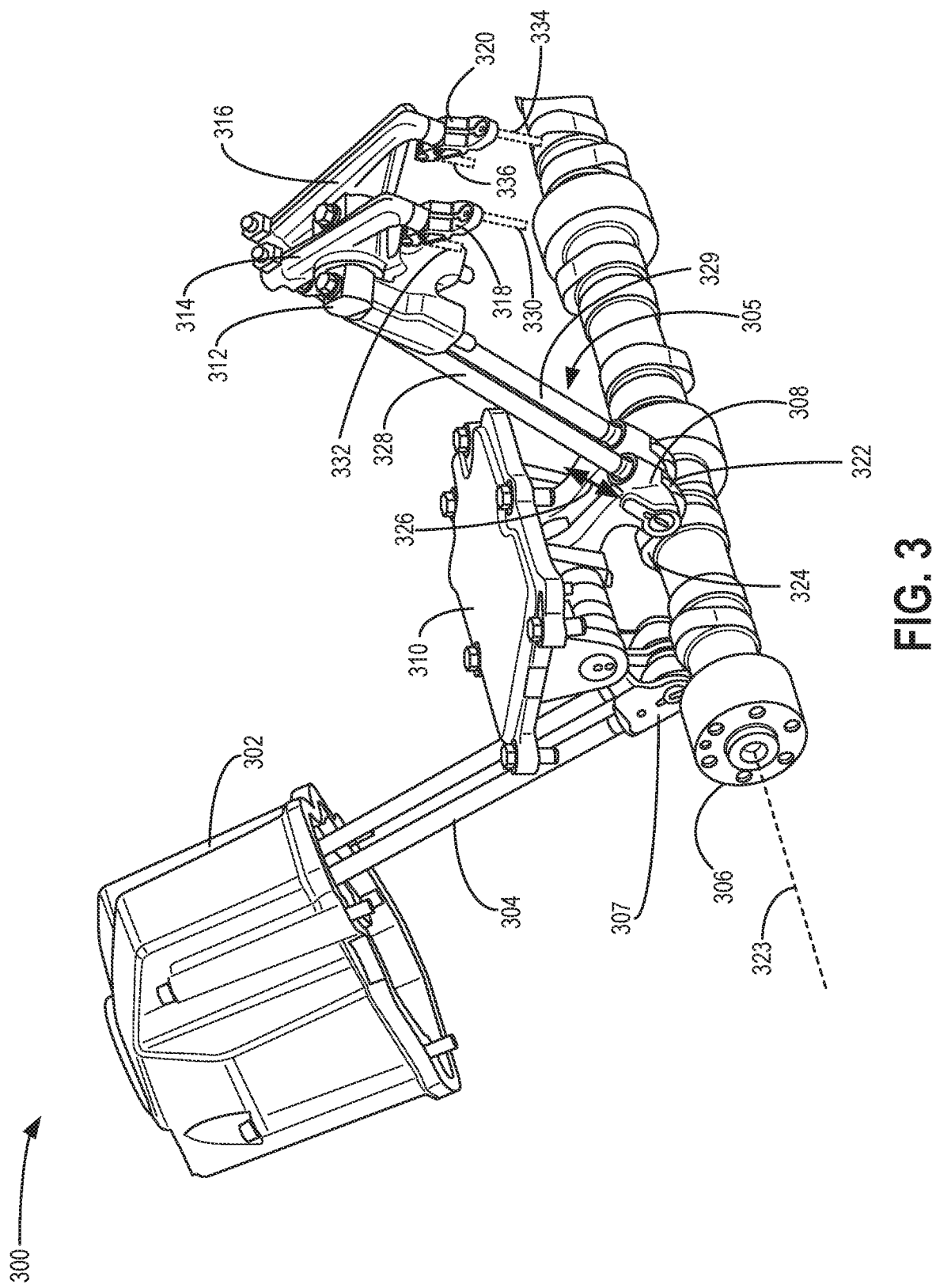
FIG. 3 shows a perspective view of a portion of a valve train system including a valve bridge.

Example systems including a valve bridge are shown by FIGS. 1-3. FIGS. 4-10C show different views of a valve bridge that may be included in the systems shown by FIGS. 1-3.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of a valve bridge for an engine system, an example of an engine system is disclosed. FIG. 1 shows a block diagram of an embodiment of a vehicle system 100 (e.g., engine system), herein depicted as a rail vehicle 106 (e.g., locomotive), configured to run on a rail 102 via a plurality of wheels 112. As depicted, the rail vehicle includes an engine 104, and the engine includes a plurality of combustion chambers 105 (e.g., cylinders). In other non-limiting embodiments, the engine may be a stationary engine, such as in a power-plant application, or an engine in a marine vessel or other off-highway vehicle propulsion system or systems as noted above. The cylinders of the engine are configured to receive fuel (e.g., diesel fuel) from a fuel system 103 via a fuel conduit 107. In some examples, the fuel conduit may be coupled with a common fuel rail and a plurality of fuel injectors.

The engine receives intake air for combustion from an intake passage 114. The intake passage receives ambient air from an air filter 160 that filters air from outside of the rail vehicle. The intake passage may include and/or be coupled to an intake manifold of the engine. Exhaust gas resulting from combustion in the engine is supplied to an exhaust passage 116. Exhaust gas flows through the exhaust passage, and out of an exhaust stack of the rail vehicle. In one example, the engine is a multi-fuel engine that combusts air and two or more fuels through compression ignition. For example, the engine may combust two or more fuels including gasoline, kerosene, natural gas (e.g., gaseous fuel), biodiesel, or other petroleum distillates of similar density through compression ignition (and/or spark ignition, and/or other forms of ignition such as laser, plasma, or the like). As explained further below, the engine may operate in a multi-fuel mode where two or more fuels are simultaneously combusted in engine cylinders or in a single-fuel mode where only a single fuel is combusted in the engine cylinders. In one embodiment, the single-fuel mode may be a diesel fuel mode where 100% diesel fuel is combusted at the engine cylinders. In another example, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders.

In one example, the rail vehicle is a diesel-electric vehicle. As depicted in FIG. 1, the engine is coupled to an electric power generation system, which includes an alternator/generator 122 and electric traction motors 124. In one example, the alternator/generator may include a direct current (DC) generator. For example, the engine may be a diesel and/or natural gas engine that generates a torque output that is transmitted to the electric generator which is mechanically coupled to the engine. As explained above, the engine may be a multi-fuel engine operating with diesel fuel and natural gas, but in other examples the engine may use other straight/mono fuels such as gasoline, diesel, or natural gas, or may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one wheel of the plurality of wheels to provide tractive power to propel the rail vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

The vehicle system may include a turbocharger 120 that is arranged between the intake passage and the exhaust passage. In alternate embodiments, the turbocharger may be replaced with a supercharger. The turbocharger increases air charge of ambient air drawn into the intake passage in order to provide greater charge density during combustion to increase power output and/or engine-operating efficiency. As shown in FIG. 1, the turbocharger includes a compressor 121 (disposed in the intake passage) which is at least partially driven by a turbine 123 (disposed in the exhaust passage). While in this case a single turbocharger is included, the system may include multiple turbine and/or compressor stages. A temperature sensor 125 is positioned in the exhaust passage, upstream of an inlet of the turbine. In this way, the temperature sensor may measure a temperature of exhaust gases entering the turbine. As shown in FIG. 1, a wastegate 127 is disposed in a bypass passage around the turbine and may be adjusted, via actuation from controller 110, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system also includes a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage is additionally coupled to atmosphere, or exterior to the engine. In an alternate embodiment, the compressor bypass passage may be coupled to the intake passage, upstream of the compressor, and the exhaust passage, downstream of the turbine. In yet another embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage is configured to divert airflow (e.g., from before the compressor inlet) away from the engine (or intake manifold of the engine) and to atmosphere. In the embodiment where the passage is instead an engine bypass passage, the engine bypass passage is configured to divert boosted airflow (e.g., from the compressor outlet) away from the engine and to atmosphere. A compressor bypass valve (CBV) 142 is positioned in the compressor bypass passage and includes an actuator actuatable by the controller to adjust the amount of intake airflow diverted away from the engine and to atmosphere. In one example, the compressor bypass valve may be a two-position, on/off valve. In another example, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all of the intake airflow may travel to the compressor and then to the engine for combustion in the engine cylinders.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system).

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system.

The rail vehicle further includes the engine controller (referred to herein as the controller) to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the rail vehicle, may be configured to receive signals from a variety of engine sensors, as further elaborated herein, in order to determine operating parameters and operating conditions, and correspondingly adjust various engine actuators to control operation of the rail vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the rail vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the rail vehicle. In one example, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

FIG. 2 depicts an embodiment of a combustion chamber, or cylinder 200, of a combustion system 290. In one example, the combustion system may be included within the engine described above with reference to FIG. 1. The cylinder may be capped by a cylinder head 201. The cylinder head houses the intake and exhaust valves and liquid fuel injector, described below, and is coupled to a cylinder block 203 forming the cylinder.

The engine may be controlled at least partially by a control system including a controller (e.g., such as the controller shown by FIG. 1 and described above) which may be in further communication with a vehicle system including the engine, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, or the like. Correspondingly, the controller may control the vehicle system by sending commands to various components such as alternator, cylinder valves, throttle, fuel injectors, or the like.

The cylinder (e.g., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger (not shown in FIG. 2) and to atmosphere, via an exhaust manifold. The exhaust passage may further receive exhaust gases from other cylinders of the engine in addition to the cylinder shown by FIG. 2, for example.

Each cylinder of the engine may include at least two intake valves and/or exhaust valves. For example, the cylinder may include at least two intake valves similar to intake poppet valve 214 and at least one exhaust valve similar to exhaust poppet valve 216. As another example, the cylinder may include at least one intake valve (e.g., intake poppet valve) and at least two exhaust valves (e.g., similar to the exhaust poppet valve described above). In yet another example, the cylinder may include two or more intake valves similar to the intake poppet valve described above and two or more exhaust valves similar to the exhaust poppet valve described above, with the intake valves and exhaust valves located at the cylinder head.

The intake valve (or plurality of intake valves) may be controlled by the controller via an intake valve actuator 218. Similarly, the exhaust valve (or plurality of exhaust valves) may be controlled by the controller via an exhaust valve actuator 220. In some examples, the position of the intake valve and the exhaust valve may be determined by respective valve position sensors 222 and 224, respectively, and/or by cam position sensors. The valve actuators may be of the cam actuation type, such that the intake and exhaust valves shown in FIG. 2 may be mechanically actuated via a rotating camshaft and valvetrain to control opening and closing the valves. In this way, the intake valve actuator and exhaust valve actuator may be in the form of a camshaft and valvetrain.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may be controlled to have variable lift by the controller based on operating conditions.

A mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

Each cylinder of the engine is coupled with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a liquid fuel system which may include a fuel tank, fuel pumps, and a common fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, or the like, located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted (e.g., adjusted by the controller) to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel.

In the examples described herein, at least one cylinder of the engine includes a pair of valves (e.g., intake valves or exhaust valves) coupled to a valve bridge, such as the valve bridge shown by FIGS. 4-10C and described below. For example, a cylinder of the engine may include a pair of two intake valves, with a first intake valve of the pair coupled to a first arm of the valve bridge and a second intake valve of the pair coupled to an opposing, second arm of the valve bridge. The valve bridge may be driven (e.g., moved) in order to synchronously open and/or close each of the intake valves of the pair of intake valves. In this way, the pair of intake valves may be actuated simultaneously via movement of the valve bridge. Although intake valves are described above coupled to the valve bridge, in some examples the cylinder may include exhaust valves (e.g., a pair of exhaust valves) coupled to the valve bridge. Further, in some examples, the cylinder may include a pair of intake valves and a pair of exhaust valves, with each pair of valves coupled to a corresponding valve bridge. An example of a valve train system which may include the valves and valve bridge as described above (and which may be included within the engine system of FIG. 1) is shown by FIG. 3 and described below.

FIG. 3 shows a perspective view of a valve train system 300 of an engine system, such as the engine systems described above with reference to FIGS. 1-2. FIG. 3 is an isolated view of the valve train system, and the valve train system may include additional components not shown by FIG. 3. Additionally, the valve train system may include and/or be coupled to one or more components similar to those included by the engine systems described above with reference to FIGS. 1-2. For example, a camshaft 306 may be coupled to an output of an engine and may be driven (e.g., rotated) by the engine.

The valve train system includes cylinder head cover assembly 302, first pushrod assembly 304, second pushrod assembly 305, the camshaft, a first finger follower assembly 307, second finger follower assembly 308, a follower support assembly 310, a rocker shaft assembly 312, an exhaust rocker arm assembly 314, an intake rocker arm assembly 316, an exhaust valve bridge 318, and an intake valve bridge 320. The cylinder head cover assembly (e.g., first cylinder head cover assembly) may couple to a cylinder head of the engine (e.g., cylinder head 201 described above), in some examples, and may cover one or more intake valves and/or exhaust valves of the engine and their corresponding coupled components. For example, although not shown by FIG. 3, a second cylinder head cover assembly similar to the cylinder head cover assembly described above may be coupled to the cylinder head in a position opposite to the first cylinder head cover assembly across the camshaft and may cover (e.g., house) at least a portion of the rocker shaft assembly, the exhaust rocker arm assembly, intake rocker arm assembly, exhaust valve bridge, intake valve bridge, and the second pushrod assembly. In this configuration, the first cylinder head cover assembly may cover components coupled to a first cylinder of the engine (e.g., intake valves and exhaust valves coupled to the first cylinder), and the second cylinder head cover assembly may cover components coupled to a second cylinder of the engine (e.g., intake valves and exhaust valves coupled to the second cylinder, as well as at least a portion of the rocker shaft assembly, exhaust rocker arm assembly, intake rocker arm assembly, exhaust valve bridge, intake valve bridge, and the second pushrod assembly).

The first finger follower assembly and second finger follower assembly 308 are each coupled to the follower support assembly and supported in their position relative to the camshaft via the follower support assembly. In one example, the follower support assembly may be directly coupled (e.g., bolted) to the cylinder head of the engine, and each of the first finger follower assembly and the second finger follower assembly 308 may be directly coupled to the follower support assembly. In this configuration, the position of each of the first finger follower assembly and the second finger follower assembly 308 relative to the camshaft is maintained by the follower support assembly.

Roller elements of the second finger follower assembly 308 may be positioned in engagement with cams of the camshaft. As the camshaft is driven (e.g., rotated) by the engine, the roller elements remain in direct contact with the cams of the camshaft, with the roller elements rotating within the second finger follower assembly 308. For example, the second finger follower assembly 308 includes a roller element 322, with the roller element rotatably coupled with the second finger follower assembly 308 (e.g., the roller element may rotate within the second finger follower assembly 308). The roller element may engage with the surfaces of a corresponding cam 324 of the camshaft, and as the camshaft rotates in a first direction (e.g., clockwise), the roller element may rotate in the opposite direction (e.g., counter-clockwise) due to the engagement of the surfaces of the roller element with the surfaces of the cam. The cam may include a base circle section and a lobe section. The cam may be coupled to the camshaft (or formed with the camshaft as a single unit) in a position such that each portion of the base circle section of the cam is positioned a same distance (e.g., a same length) from an axis of rotation 323 of the camshaft. The lobe section may be shaped such that each portion of the lobe section is positioned further from the axis of rotation than the base circle section. As the camshaft rotates around the axis of rotation, the engagement of the cam with the roller element may adjust a position of the roller element within the second finger follower assembly 308.

For example, during conditions in which the surfaces of the roller element are in direct contact with the surfaces of the cam forming the base section of the cam, the roller element may rotate within the second finger follower assembly 308 but the translational position of the roller element relative to the second finger follower assembly 308 may be maintained (e.g., the roller element may not move toward or away from the camshaft). However, during conditions in which the surfaces of the cam forming the lobe section of the cam are in direct contact with the surfaces of the roller element, the roller element may be driven toward or away from the camshaft (e.g., in the directions indicated by arrow 326) within the second finger follower assembly 308 as the camshaft rotates. The roller element may be biased by a biasing member (e.g., a spring) in a direction toward the camshaft such that the surfaces of the roller element are maintained in direct contact with the surfaces of the cam via the force of the biasing member against the roller element.

The roller element is coupled to a pushrod 328 of the second pushrod assembly. During conditions in which the roller element is driven toward or away from the camshaft due to engagement of the roller element with the lobe section of the cam as the camshaft rotates, the pushrod is driven toward or away from the camshaft in a similar way. Specifically, the pushrod may be coupled with the roller element in such a way that translational movement of the roller element in the directions indicated by arrow 326 results in a similar translational movement of the pushrod in the same directions. For example, moving the roller element away from the camshaft by a first amount may move the pushrod away from the camshaft by the same amount due to the coupling of the roller element with the pushrod.

As the pushrod moves due to the rotation of the camshaft (e.g., via the engagement of the roller element with the cam as described above), the pushrod adjusts a position of a rocker arm of the rocker arm assembly (e.g., pivots the rocker arm around the rocker shaft assembly) in order to adjust a position of the exhaust valve bridge. The exhaust valve bridge may be coupled to the rocker arm such that motion of the rocker arm results in motion of the exhaust valve bridge.

For example, during conditions in which the pushrod is driven away from the camshaft, the pushrod may pivot the rocker arm in a first direction in order to move the exhaust valve bridge toward the engine cylinder (e.g., the cylinder of the engine including intake valves and exhaust valves driven by the second pushrod assembly) to adjust exhaust valves coupled to the exhaust valve bridge (e.g., exhaust valves 330 and 332, shown schematically in FIG. 3) from a closed position (e.g., a fully closed position in which the exhaust valves are seated against corresponding surfaces of the cylinder head in order to seal a flow of exhaust gases from the cylinder) to an opened position (e.g., a position in which the exhaust valves are not seated against the corresponding surfaces of the cylinder head and exhaust gases may flow around the exhaust valves and out of the cylinder). During conditions in which the pushrod is driven toward the camshaft, the pushrod may pivot the rocker arm in an opposing, second direction in order to move the exhaust valve bridge away from the engine cylinder to adjust the exhaust valves coupled to the exhaust valve bridge from an opened position (e.g., a fully opened position) to a closed position (e.g., the fully closed position). In this way, the position of the exhaust valve bridge is adjusted via the rotation of the camshaft in order to adjust the position of the exhaust valves relative to the cylinder of the engine (e.g., in order to open or close the exhaust valves). Because the exhaust valves are each coupled to the exhaust valve bridge, adjusting the position of the exhaust valve bridge adjusts the position of each of the exhaust valves together. In one example, the exhaust valves may each be similar to exhaust poppet valve 216 shown by FIG. 2 and described above, and the cylinder may be similar to the cylinder 200 shown by FIG. 2 and described above.

Although the cam, roller element, pushrod, and exhaust valve bridge are described above as one example, the valves (e.g., intake valves and exhaust valves) of each cylinder of the engine may be driven by components having a similar configuration. For example, intake valves 334 and 336 (shown schematically by FIG. 3) are coupled to the intake valve bridge and may be driven by corresponding components similar to those described above to drive the exhaust valves. Specifically, the intake valve bridge may be coupled to a corresponding rocker arm of the intake rocker arm assembly, with the rocker arm of the intake rocker arm assembly being pivoted via a separate, corresponding pushrod 329 of the second pushrod assembly, and with the pushrod 329 being driven by a separate, corresponding roller element and cam of the camshaft (e.g., similar to roller element 322 and cam 324 described above). The first pushrod assembly and first finger follower assembly may include a similar configuration relative to the second pushrod assembly and second follower assembly 308 in order to drive intake valves and exhaust valves of a different cylinder of the engine (e.g., different than the cylinder coupled with the exhaust valves and intake valves driven by the exhaust valve bridge and the intake valve bridge, respectively). In some examples, each valve bridge (e.g., the exhaust valve bridge and the intake valve bridge) may have a same shape. For example, the exhaust valve bridge and the intake valve bridge may each be similar to the valve bridge described below with reference to FIGS. 4-10C.

FIGS. 4-10C show various views of a valve bridge 400, similar to the valve bridges described above with reference to FIG. 3 (e.g., the exhaust valve bridge and the intake valve bridge). For example, the valve bridge shown by FIGS. 4-10C may be included within a valve train system of an engine (e.g., valve train system 300 described above) and may be coupled to cylinder valves (e.g., intake valves or exhaust valves) of the engine. As one example, the valve bridge may be coupled to intake valves of a cylinder of the engine (e.g., intake valves 334 and 336 shown by FIG. 3). As another example, the valve bridge may be coupled to exhaust valves of a cylinder of the engine (e.g., exhaust valves 330 and 332 shown by FIG. 3). In some examples, the valve train system (e.g., valve train system 300 described above) may include a plurality of valve bridges similar to the valve bridge, and for each cylinder of the engine, a first valve bridge similar to the valve bridge may be coupled to intake valves of the cylinder and a second valve bridge similar to the valve bridge may be coupled to exhaust valves of the cylinder. Reference axes 499 are included in each of FIGS. 4-10C for relative comparison of the views shown.

Figure 4:
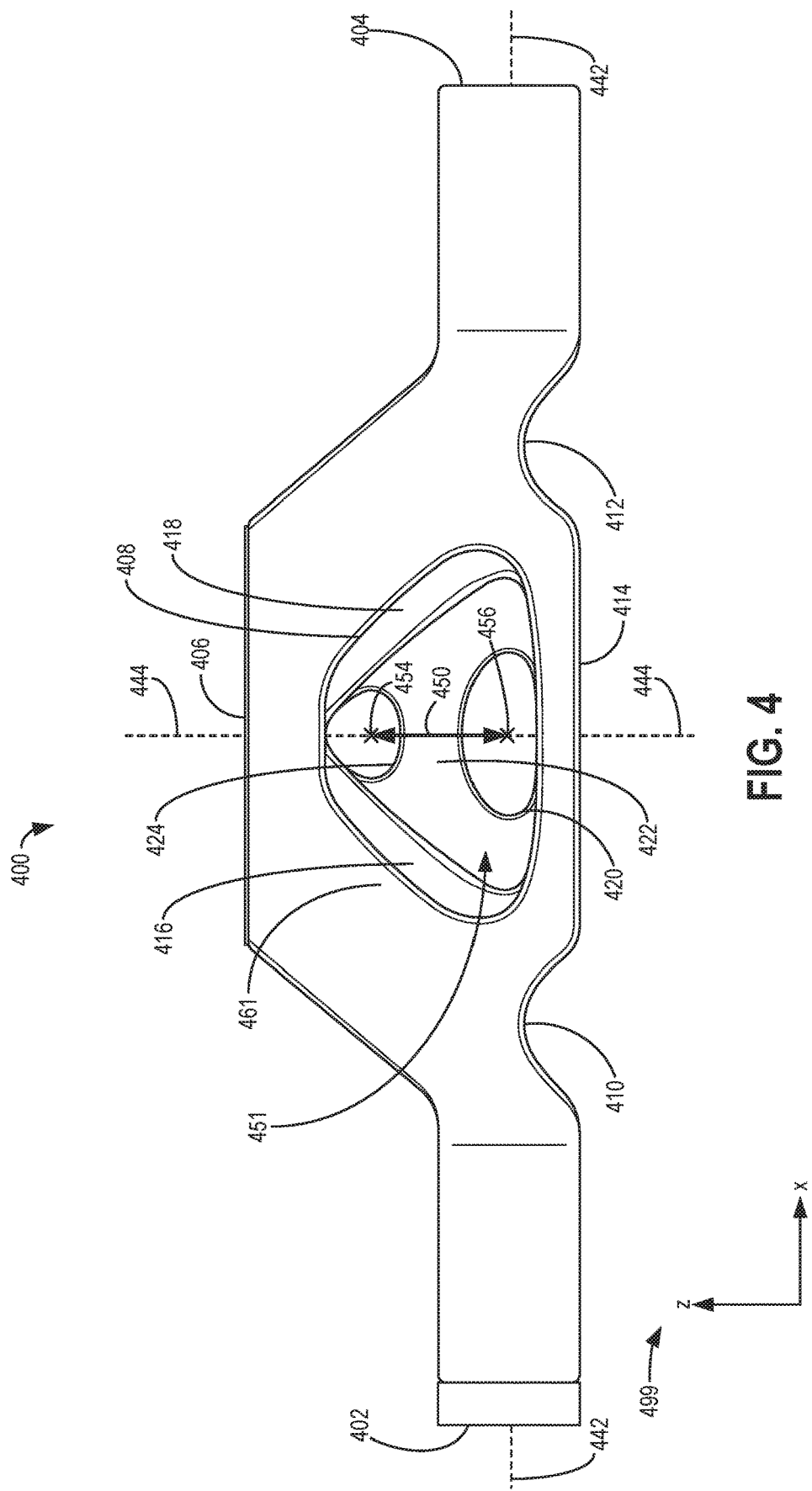
FIG. 4 shows a front view of a valve bridge for a valve train system of an engine.
Figure 5:
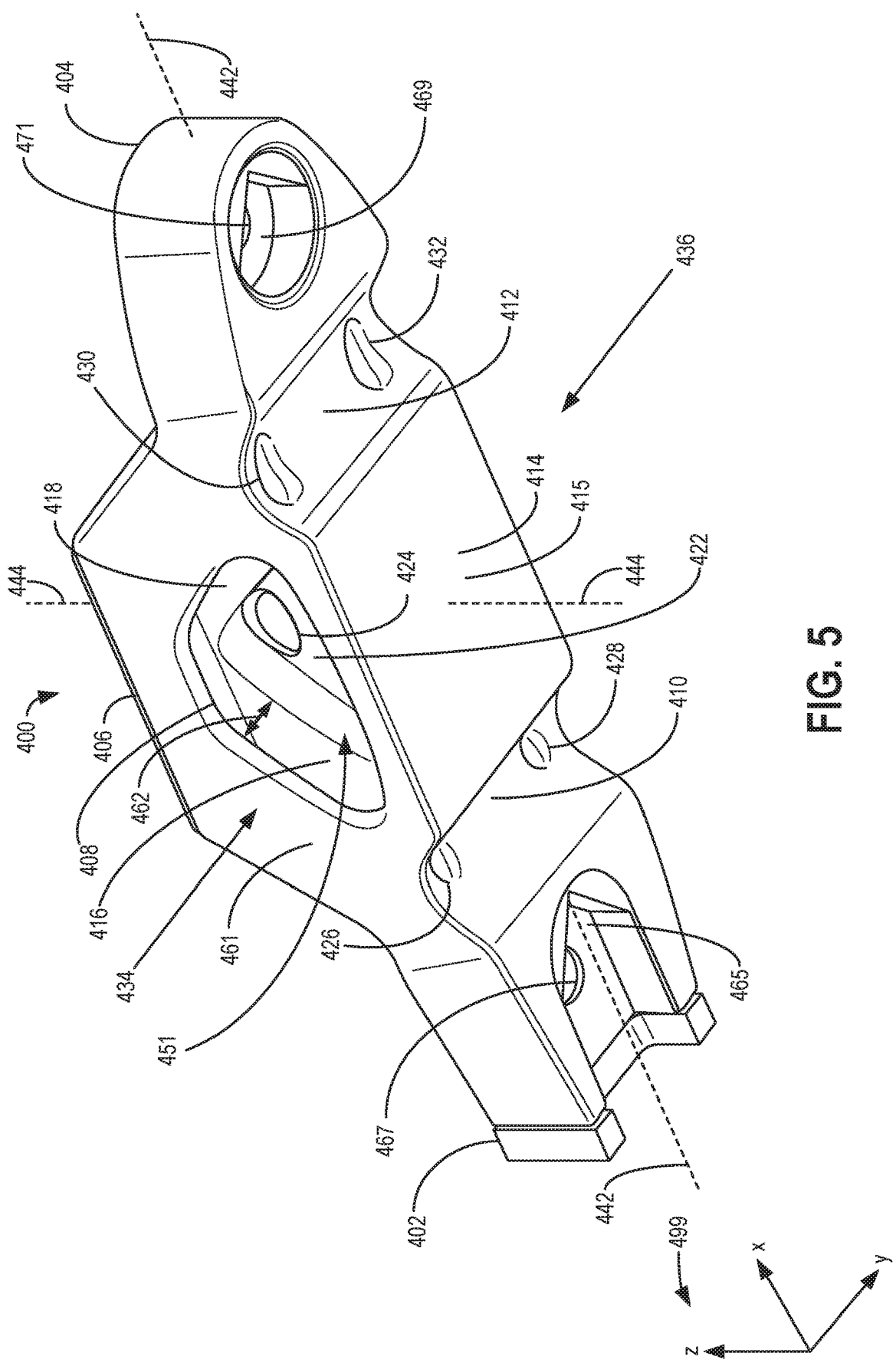
FIG. 5 shows a bottom perspective view of the valve bridge of FIG. 4.
Figure 6:
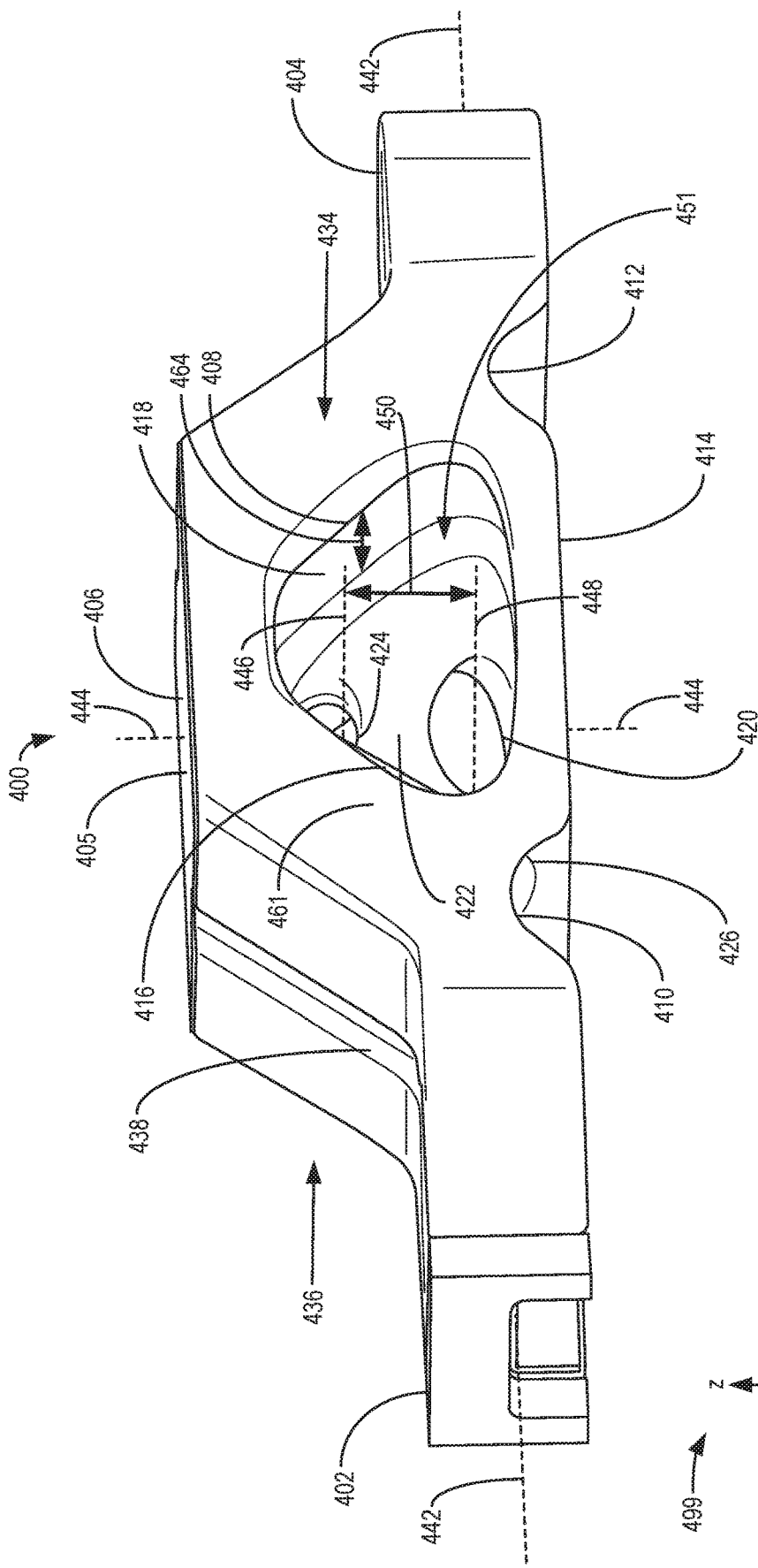
FIG. 6 shows a left perspective view of the valve bridge of FIGS. 4-5.
Figure 7:
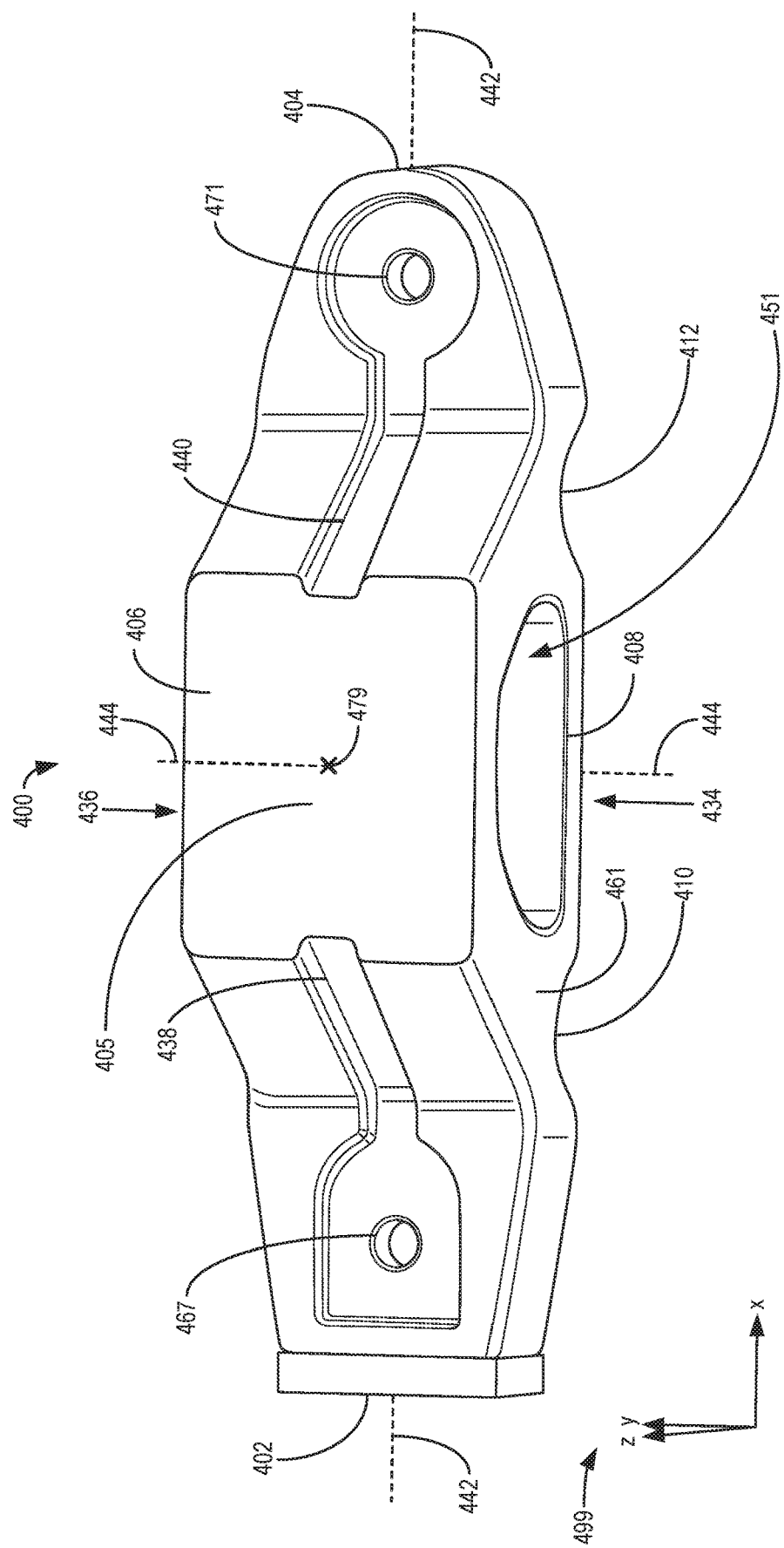
FIG. 7 shows a top perspective view of the valve bridge of FIGS. 4-6.
Figure 8A:
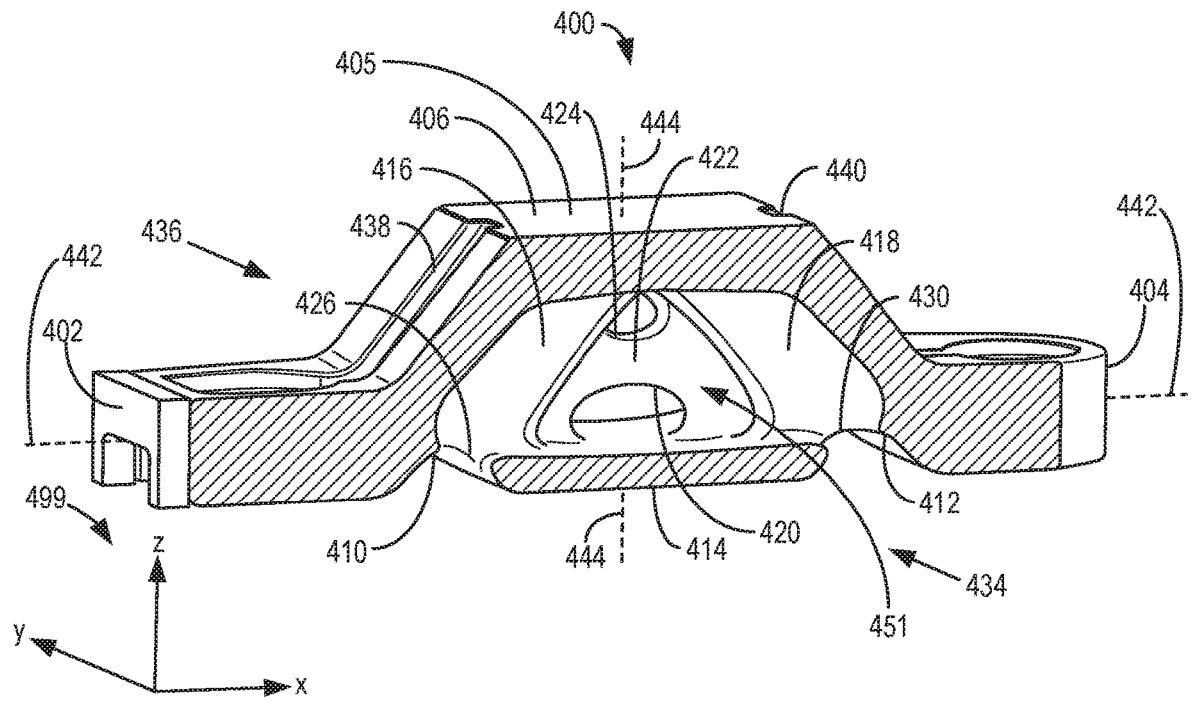
FIG. 8A shows a front cross-sectional view of the valve bridge of FIGS. 4-7.
Figure 8B:
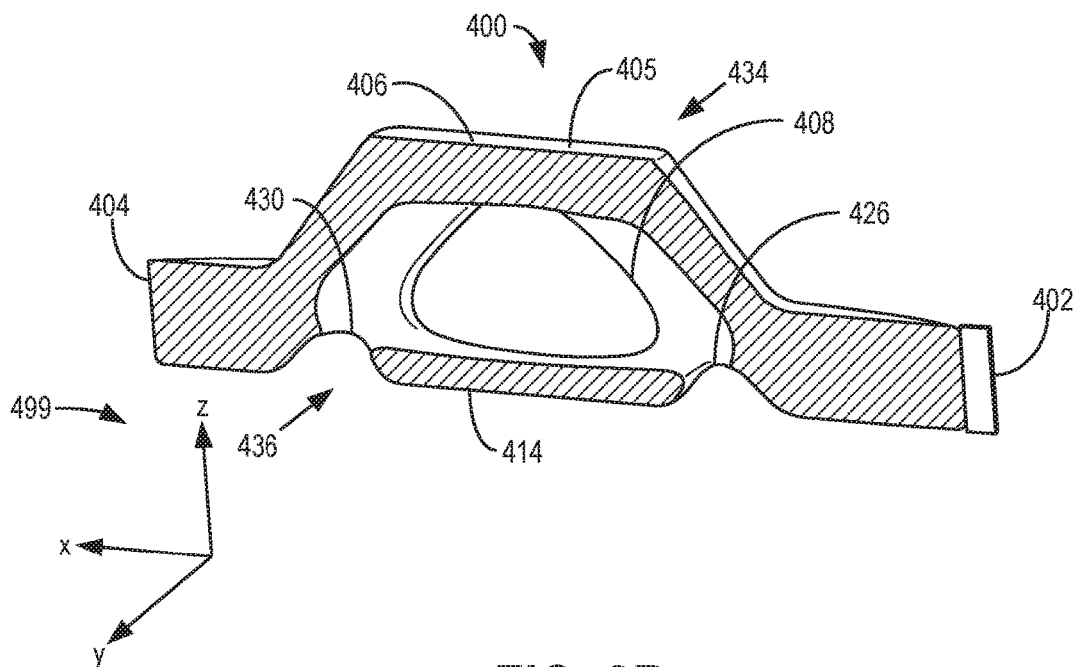
FIG. 8B shows a rear cross-sectional view of the valve bridge.

FIGS. 4-10C show various different views of the valve bridge. Specifically, FIG. 4 shows a front view of the valve bridge, FIG. 5 shows a bottom perspective view of the valve bridge, FIG. 6 shows a left perspective view of the valve bridge, FIG. 7 shows a top perspective view of the valve bridge, FIG. 8A shows a front cross-sectional view of the valve bridge, FIG. 8B shows a rear cross-sectional view of the valve bridge, FIG. 9 shows a top cross-sectional view of the valve bridge, and FIGS. 10A-10C show side cross-sectional views of the valve bridge. The valve bridge includes a first arm 402 and a longitudinally opposing second arm 404. Each of the first arm and the second arm are intersected by a longitudinal axis 442 of the valve bridge (with the longitudinal axis positioned parallel with the x-axis of the reference axes 499). Each of the first arm and the second arm includes a corresponding recess (described further below) adapted to couple with a corresponding valve (e.g., intake valve or exhaust valve) of a valve train system, such as the valve train system 300 described above with reference to FIG. 3.

The valve bridge includes a first end 406 and an opposing, second end 414, with each of the first end and second end intersected by a vertical axis 444 of the valve bridge (with the vertical axis positioned parallel with the z-axis of the reference axes 499). The vertical axis is positioned perpendicular (e.g., orthogonal) to the longitudinal axis of the valve bridge. During conditions in which the valve bridge is included within a valve train system such as the valve train system 300 described above with reference to FIG. 3, the first end of the valve bridge may be coupled to a corresponding rocker arm assembly of the valve train system (e.g., directly coupled in face-sharing contact with a rocker arm of the rocker arm assembly). For example, the valve bridge may be coupled to the corresponding rocker arm assembly of the valve train system in a configuration similar to the coupling of the exhaust valve bridge 318 with the exhaust rocker arm assembly 314 as shown by FIG. 3.

As one example, an end of a rocker arm of the rocker arm assembly may be positioned in face-sharing contact with an exterior end surface 405 (shown by FIG. 7) of the valve bridge at the first end (e.g., similar to the example shown by FIG. 3, with an end of a rocker arm of exhaust rocker arm assembly 314 positioned in face-sharing contact with an exterior end surface of exhaust valve bridge 318). A pivoting motion of the rocker arm may press the end of the rocker arm against the exterior end surface at the first end in order to move the valve bridge (e.g., drive the valve bridge in a direction away from the rocker arm and toward cylinder valves of the engine coupled to the valve bridge). Further, a pivoting motion of the rocker arm away from the valve bridge may move the valve bridge (e.g., drive the valve bridge) in a direction toward the rocker arm and away from the cylinder valves of the engine (e.g., due to a biasing of the valves against the valve bridge resulting from biasing members, such as valve springs, coupled to the valves). Thus, the coupling of the first arm and second arm of the valve bridge to the corresponding valves of the engine enables the valves to be driven (e.g., opened or closed) synchronously via the pivoting of the rocker arm engaged with the valve bridge. For clarity, driving valves synchronously refers to driving the valves via the valve bridge (e.g., driving the valve bridge) such that the valves coupled to the valve bridge are opened and/or closed simultaneously relative to each other.

The valve bridge includes a passage 451 (e.g., a cavity) extending laterally through at least a portion of the valve bridge (e.g., extending through a central portion of the valve bridge in a lateral direction perpendicular to both of the longitudinal axis and vertical axis of the valve bridge). The passage opens to a first main opening 408 at a first side 434 of the valve bridge (as shown by FIG. 5, for example) and a second main opening 474 at an opposing, second side 436 of the valve bridge (as shown by FIGS. 10B-10C, for example). The passage opens to an exterior of the valve bridge via the first main opening and the second main opening. The passage extends from the first main opening to the second main opening and may not be sealed (e.g., not sealed to atmosphere). For example, fluid (e.g., air, oil, etc.) may flow through the passage of the valve bridge from the first main opening to the second main opening, and vice versa. The passage is formed by one or more interior walls of the valve bridge, such as lower interior wall 441 and opposing, upper interior wall 439 (shown by FIG. 10B). The passage is disposed between the first arm and second arm and forms each of the first main opening and the opposing, second main opening. In particular, the passage extends laterally through the valve bridge (e.g., in the direction of a lateral axis 473 of the valve bridge, shown by FIG. 10B), with the first arm and second arm extending in a longitudinal direction of the valve bridge (e.g., perpendicular to the passage in the direction of the longitudinal axis, with the longitudinal axis being parallel to the x-axis of the reference axes).

A central support structure 422 (e.g., a wall or separator) is disposed within the passage and is formed by the one or more interior walls. For example, the lower interior wall, upper interior wall, and central support structure may be formed as a single, continuous unit (e.g., formed via an additive manufacturing process, as described below with reference to FIG. 11). The central support structure may be centered within the passage. For example, the central support structure may be positioned at a midpoint of the passage in the lateral direction of the valve bridge (e.g., the direction of the lateral axis of the valve bridge shown by FIG. 10B from the first main opening at the first side to the second main opening at the second side, with the lateral axis intersecting each of a midpoint 475 of the first main opening and a midpoint 477 of the opposing, second main opening). In one example, the central support structure may be a relative flat, planar wall having a relatively uniform thickness. In other examples, the central support structure may include one or more grooves, protrusions, portions having increased or decreased thickness, etc.

During conditions in which the valve bridge is included within a valve train system of an engine and is driven by a rocker arm of the engine during engine operation, the central support structure is configured to rigidly support movement of the first arm and second arm against the cylinder valves (e.g., intake valves or exhaust valves) coupled to the valve bridge. For example, as the valve bridge is driven by the rocker arm, the central support structure may increase a rigidity of the first arm and second arm and reduce a likelihood of flexion of the first arm and second arm.

The central support structure defines an upper opening 424 (which may be referred to herein as a first opening of the central support structure) spaced from a lower opening 420 (which may be referred to herein as a second opening of the central support structure) by a midsection 423 of the central support structure (shown by at least FIG. 10B), the midsection extending longitudinally through the passage (e.g., in a direction from the first arm to the second arm, and in the direction of the longitudinal axis). By configuring the central support structure to include the upper opening and the lower opening, a weight of the valve bridge may be decreased. Additionally, a flow path of fluid (e.g., air, oil, etc.) through the valve bridge may be increased. In the example shown by FIGS. 4-10C, the central support structure includes two openings (e.g., the upper opening and lower opening). In other examples, the central support structure may include a different number of openings (e.g., one, three, four, etc.). However, in each example, the central support structure includes at least one opening. By configuring the central support structure to include at least one opening, a weight of the valve bridge may be reduced.

The one or more interior walls forming the passage and the central support structure include first arched section 416 and second arched section 418 positioned laterally between the central support structure and the first main opening. Further, the one or more interior walls include a third arched section 458 and a fourth arched section 460 positioned laterally between the central support structure and the second main opening (as shown by FIG. 9). Specifically, in the lateral direction of the valve bridge (e.g., the direction of the lateral axis of the valve bridge shown by FIG. 10B, with the lateral axis being parallel to the y-axis of the reference axes), the central support structure is positioned between the first arched section and the third arched section, with the first arched section adjacent to the first main opening and the third arched section adjacent to the second main opening. Further, in the lateral direction of the valve bridge, the central support structure is positioned between the second arched section and the fourth arched section, with the second arched section adjacent to the first main opening and the fourth arched section adjacent to the second main opening. The first arched section is positioned opposite to the second arched section in the longitudinal direction of the valve bridge (e.g., the direction of the longitudinal axis of the valve bridge extending from the first arm to the second arm), and the third arched section is positioned opposite to the fourth arched section in the longitudinal direction of the valve bridge.

The first main opening opens to the passage at a first exterior side wall 461 and the second main opening opens to the passage at a second exterior side wall 463 (e.g., the passage opens to the first exterior side wall at the first main opening and the second exterior side wall at the second main opening). The first exterior side wall is positioned at the first side and the second exterior side wall is positioned at the second side, with the first exterior side wall laterally opposing the second exterior side wall (e.g., positioned opposite to the second exterior side wall in the lateral direction, from the first side to the second side). A first open space 462 laterally separates the first arched section and the first exterior side wall and a second open space 464 laterally separates the second arched section and the first exterior side wall. Specifically, the first arched section is spaced apart from the first exterior side wall by the first open space, and the second arched section is spaced apart from the first exterior side wall by the second open space. The valve bridge further includes a third open space 470 laterally separating the third arched section and the second exterior side wall and a fourth open space 472 laterally separating the fourth arched section and the second exterior side wall. The third arched section is spaced apart from the second exterior side wall by the third open space, and the fourth arched section is spaced apart from the second exterior side wall by the fourth open space. As described herein, lateral separation refers to the separation of features (e.g., spacing apart of features relative to each other, such that at least a gap or clearance is positioned between the features) in the lateral direction of the valve bridge (e.g., the direction parallel to the lateral axis of the valve bridge). Longitudinal separation refers to the separation of features (e.g., spacing apart of features relative to each other, such that at least a gap or clearance is positioned between the features) in the longitudinal direction of the valve bridge (e.g., the direction parallel to the longitudinal axis of the valve bridge), and vertical separation refers to the separation of features in the vertical direction of the valve bridge (e.g., the direction parallel to the vertical axis of the valve bridge).

The first arched section and the third arched section are joined to the central support structure with no lateral open spaces therebetween. Specifically, the first arched section, central support structure, and third arched section may be formed together (e.g., formed via an additive manufacturing process such as 3D printing, as described below with reference to FIG. 11) with no gaps or clearances therebetween in the lateral direction (e.g., the direction of the lateral axis of the valve bridge). Further, the second arched section and the fourth arched section are joined to the central support structure with no lateral open spaces therebetween. The second arched section, central support structure, and fourth arched section may be formed together (e.g., formed via the additive manufacturing process, as described below with reference to FIG. 11) with no gaps or clearances therebetween in the lateral direction. In this configuration, the first arched section, second arched section, third arched section, fourth arched section, and central support structure are not fused (e.g., welded, adhered, etc.) to each other and are instead formed together from a same material as a continuous unit (e.g., via the additive manufacturing process). Further, each other portion of the valve bridge (e.g., portions other than the first arched section, second arched section, third arched section, fourth arched section, and central support structure) may be formed together with the first arched section, second arched section, third arched section, fourth arched section, and central support structure such that the valve bridge is a single, unitary piece formed from a same material via a same manufacturing process (e.g., the additive manufacturing process).

A midpoint 454 of a first opening of the wall or separator (e.g., the upper opening of the central support structure described above) and a midpoint 456 of a second opening of the wall or separator (e.g., the lower opening of the central support structure described above) may each be positioned along the vertical axis arranged perpendicular to the lateral axis and intersecting the lateral axis. The midpoint of the first opening is offset (e.g., spaced apart) from the midpoint of the second opening by a length 450 along the vertical axis. Specifically, an axis 446 intersecting the midpoint of the first opening is offset from an axis 448 intersecting the midpoint of the second opening by the length 450, with the axis 446 and axis 448 offset (e.g., spaced apart) from each other in the direction of the vertical axis. In this configuration, the openings (e.g., upper opening and lower opening) of the central support structure are spaced apart from each other such that the openings do not intersect each other.

First exterior end surface 415 (shown by FIG. 5) of the valve bridge defines a first groove 410 and a second groove 412. Each of the first and second grooves extends laterally along the first exterior end surface from the first side of the valve bridge (e.g., the side including the first main opening) to the second side of the valve bridge (e.g., the side including the second main opening). The first groove and second groove may be positioned parallel to each other and extend in the direction parallel to the lateral axis of the valve bridge. The first groove is positioned longitudinally at the first exterior end surface between the passage and the first arm (e.g., the passage is positioned at a first side of the first groove and the first arm is positioned at a second side of the second groove). The second groove is positioned longitudinally at the first exterior end surface between the passage and the second arm (e.g., the passage is positioned at a first side of the second groove and the second arm is positioned at a second side of the second groove). In this configuration, in the direction of the longitudinal axis of the valve bridge, the passage is positioned between the first groove and the second groove. The first groove includes a first orifice 426 extending into the passage between the first arched section and the first main opening, and a second orifice 428 extending into the passage between the third arched section and the second main opening. The second groove includes a third orifice 430 extending into the passage between the second arched section and the first main opening and a fourth orifice 432 extending into the passage between the fourth arched section and the second main opening.

In some examples, the passage may be configured to conduct fluid (e.g. oil) between the first exterior side wall and the second exterior side wall and through at least one opening of the central support structure (e.g., the upper opening and/or lower opening). For example, as the valve bridge is driven by the rocker arm of the engine, oil entering the passage of the valve bridge may flow out of the valve bridge via the first main opening and/or second main opening. Further, fluid (e.g., oil) may drain from the passage through one or more of the orifices (e.g., the first orifice and second orifice of the first groove, and the third orifice and fourth orifice of the second groove) such that the passage conducts oil through the one or more orifices (e.g., during operation of the engine). Oil flowing to the first and second grooves via the orifices may provide additional lubrication to valves coupled to the valve bridge in some examples. Further, the orifices and grooves of the valve bridge may reduce a weight of the valve bridge, which may reduce a load on the engine and/or increase a performance of the valve bridge (e.g., reduce an inertia of the valve bridge and increase a responsiveness of valves coupled to the valve bridge).

The first arm includes a first recess 465 having a first opening 467 and the second arm includes a second recess 469 having a second opening 471, with the first recess and the second recess each adapted to engage with a corresponding valve stem. In this configuration, the valve bridge is couplable to each of the first and second valves (e.g., first and second engine cylinder valves). For example, during conditions in which the valve bridge is included within an engine system (e.g., similar to the examples described above), the first arm of the valve bridge may be coupled to a first valve (e.g., first engine cylinder valve, such as a first intake valve) and the second arm of the valve bridge may be coupled to a second valve (e.g., second engine cylinder valve, such as a second intake valve coupled to the same cylinder as the first valve). A stem of the first valve may seat within the first recess and engage with surfaces of the first recess, and a stem of the second valve may seat within the second recess and engage with surfaces of the second recess.

The second exterior end surface 405 of the valve bridge is positioned longitudinally between the first arm and the second arm and opposite to the first exterior end surface forming the first and second grooves described above, with a first indentation 438 of the first arm and a second indentation 440 of the second arm each terminating at the second exterior end surface (with the first indentation and second indentation shown by FIG. 7). Specifically, in the example shown, the first indentation and second indentation do not extend along the portion of the valve bridge configured to engage with the end of the rocker arm (e.g., the second exterior end surface). The second exterior end surface is positioned opposite to the first exterior end surface (e.g., the exterior end surface defining the first groove and the second groove, described above) in the vertical direction of the valve bridge (e.g., the direction of the vertical axis of the valve bridge). Specifically, the first exterior end surface defining the first groove and second groove is positioned at the second end of the valve bridge, and the second exterior surface is positioned at the opposite, first end of the valve bridge. In some examples, the first indentation and second indentation may each channel fluid (e.g., oil) to valves coupled to the valve bridge in order to provide lubrication to the valves. For example, the first indentation is joined to the first opening 467 and the second indentation is joined to the second opening 471. Oil may flow along the first indentation and into the first opening, where the oil may lubricate a first valve (e.g., first intake valve) coupled to the valve bridge at the first arm. Similarly, oil may flow along the second indentation and into the second opening, where the oil may lubricate a second valve (e.g., second intake valve) coupled to the valve bridge at the second arm. In this configuration, lubrication of the valves coupled to the valve bridge may be increased, and a likelihood of wear of the valves and/or valve bridge may be reduced.

As described above, the second exterior end surface is adapted to engage with the engine rocker arm (e.g., an end of the engine rocker arm). A midpoint 479 of the second exterior end surface is positioned along the vertical axis of the valve bridge (e.g., the axis extending perpendicular to each of the longitudinal axis and lateral axis and shown intersecting the midpoints of the upper opening and lower opening of the central support structure). In this configuration, the end of the rocker arm may engage with the second exterior end surface at the midpoint of the second exterior end surface. By forming the valve bridge to include the features described above (e.g., the passage, arched sections, grooves, orifices, etc.), a rigidity of the valve bridge may be increased and a weight of the valve bridge may be decreased. Further, the features described above may enable fluid (e.g., oil) to flow more freely through the valve bridge, which may result in increased lubrication of valves coupled to the valve bridge and a decreased likelihood of wear of the valves and/or valve bridge. In some examples, the valve bridge may be formed with the features described above via an additive manufacturing process such as 3D printing, as described below with reference to FIG. 11.

FIG. 11 is a flow chart illustrating an example method 1000 for manufacturing a valve bridge for a valve train system of an engine, such as the valve bridge shown by FIGS. 4-10C. Method 1000 may be carried out at least in part by a 3D printing device, which may be operatively/communicatively coupled to a printer-interfacing computing device.

At 1002, method 1000 includes obtaining or generating a 3D model of the valve bridge. The model of the valve bridge may be a computer aided design (CAD) file, additive manufacturing file (AMF), or other 3D modeling file. The 3D model of the valve bridge may be generated on the printer-interfacing computing device. In some examples, the 3D model may be generated entirely from operator instructions via the CAD program. In other examples, the 3D model may be generated at least in part from information received from a 3D scanner (e.g., a laser scanner) that may image a physical model of the valve bridge. The 3D model may define the dimensions of the valve bridge, exterior and interior structures of the valve bridge, and material properties of the valve bridge, thereby fully representing, in a digital format, the final form of the valve bridge that will be produced.

At 1004, a plurality of 2D slices of the 3D model of the valve bridge are generated. The slices may be generated on the printer-interfacing computing device and then the plurality of slices are sent to the printing device as an STL file, or the 3D model of the valve bridge may be sent to the printing device, and the printing device may slice the 3D model into the plurality of slices to generate an STL file. In doing so, the 3D model is sliced into hundreds or thousands of horizontal layers of a suitable thickness, such as micron thickness of 20 microns to 100 microns per layer, which depends on the Additive machine and process used thereafter, but not subjected to limitation on above values.

At 1006, the printing device prints the first slice on a build plate or other suitable base material. When the printing device prints from the STL file, the printing device creates or prints the valve bridge layer-by-layer on the build plate. The printing device reads every slice (or 2D image) from the 3D model and proceeds to create the 3D valve bridge by laying down (or printing) successive layers of material on an upper, planar surface of the build plate until the entire valve bridge is created. Each of these layers can be seen as a thinly sliced horizontal cross section of the eventually completed or printed 3D valve bridge.

The printing device may be a suitable device configured to print metal, such as aluminum or stainless steel, or polymers, such as thermoplastics. In some examples, the printing device may utilize selective laser melting (SLM) technology, direct metal laser sintering (DMLS) technology, or other suitable metal printing technology.

During printing, the print head(s) is moved, in both horizontal and vertical directions, to complete or print each layer of the 3D model, by a controlled mechanism that is operated by control software running on the printing device, e.g., a computer-aided manufacturing (CAM) software package adapted for use with the printing device. The build plate is typically stationary with its upper planar surface parallel to a horizontal plane, although in some examples the build plate may be moved up and down vertically (e.g., in the z-direction). The printed material solidifies to form a layer (and to seal together layers of the 3D valve bridge), and the print head or build plate is then moved vertically prior to starting the printing of the next layer. This process is repeated until all layers of the 3D valve bridge have been printed.

Accordingly, at 1008, method 1000 includes sequentially printing each additional slice. At 1010, the printed valve bridge is dried and/or cured. The drying/curing of the printed valve bridge may be performed after each layer deposition, and/or the drying/curing may be performed after the entire valve bridge is printed. If support structures are printed in the voids of the valve bridge (e.g., scaffolding-like structures or perforated structures), the support structures may be removed manually and/or with a tool.

Thus, method 1000 provides for 3D printing of a valve bridge adapted to be coupled to a valves (e.g., intake valves or exhaust valves) of an engine. Method 1000 is directed to printing the valve bridge as a single, unitary piece.

In still further examples, the valve bridge may be manufactured using a mold. The mold may be generated by first 3D printing a model of the valve bridge in a suitable material that may be solid at room temperature but changes to liquid at a relatively low temperature that is greater than room temperature, such as wax. A plaster mold may be formed over the wax model, and after the plaster dries, the wax may be melted and drained from the mold. The mold may then be filled with molten metal. Once the metal cools, the plaster may be removed to generate the valve bridge.

Thus, the valve bridge described above with respect to FIGS. 4-10C may be manufactured using additive manufacturing technology, such as 3D printing. In an example, the valve bridge described herein may be manufactured according to a computer readable medium containing computer readable instructions which, when executed on a 3D printer, cause the printer to print the valve bridge, where the valve bridge comprises In an example, a method of creating a computer readable 3D model suitable for use in additive manufacturing of a valve bridge configured to be coupled (e.g., mounted) to a gantry of a medical imaging system is provided, wherein the valve bridge comprises a first arm, a longitudinally opposing second arm, and one or more interior walls forming a passage extending laterally through at least a portion of the valve bridge, the passage disposed between the first arm and second arm and forming a first main opening and an opposing, second main opening. A central support structure is disposed within the passage and is formed by the one or more interior walls. In an example, the method includes obtaining specifications of the valve bridge. The specifications may be obtained from user input (e.g., via a 3D modeling program such as CAD) and/or from information obtained from a 3D scanner. For example, the 3D scanner may image a physical model or prototype of the valve bridge. The method further includes generating the computer readable 3D model of the valve bridge based on the obtained specifications. The 3D model may be generated using CAD or another 3D modeling program. In some examples, the method further includes sending the 3D model to a printing device. The 3D model may be converted into an STL file or other suitable format readable by the printing device. The printing device may then print the valve bridge according to the specifications set forth by the 3D model.

FIGS. 4-10C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by forming the valve bridge to include the features described above (e.g., the passage, arched sections, grooves, orifices, etc.), a rigidity of the valve bridge may be increased and a weight of the valve bridge may be decreased. Further, the features described above may enable fluid (e.g., oil) to flow more freely through the valve bridge, which may result in increased lubrication of valves coupled to the valve bridge and a decreased likelihood of wear of the valves and/or valve bridge. Forming the valve bridge via the additive manufacturing process, such as 3D printing, enables the valve bridge to be formed with the variety of spaces, orifices, and interior walls that may otherwise be difficult to achieve via conventional manufacturing processes (e.g., molding, machining, etc.), which may reduce a cost and/or production time of the valve bridge.

By driving the valve bridge via the rocker arm of the valve train system during operation of the engine including the valve train system, with the rocker arm coupled to the first end of the valve bridge, the valve bridge may simultaneously open two cylinder valves of the valve train system. The valve bridge includes two arms and each arm is coupled to one of the two cylinder valves, with the valve bridge including the passage extending through the central portion of the bridge between the two arms. The central support structure includes at least one opening. The technical effect of driving the valve bridge via the rocker arm and configuring the valve bridge in this way is to rigidly support movement of the two arms against the two cylinder valves during the driving and to reduce a weight of the valve bridge.

In one embodiment, a valve bridge comprises: a first arm and a longitudinally opposing second arm; one or more interior walls forming a passage extending laterally through at least a portion of the valve bridge, the passage disposed between the first arm and second arm and forming a first main opening and an opposing, second main opening; and a central support structure disposed within the passage and formed by the one or more interior walls. In a first example of the valve bridge, the central support structure defines an upper opening spaced from a lower opening by a midsection of the central support structure, the midsection extending longitudinally through the passage. A second example of the valve bridge optionally includes the first example, and further includes wherein the one or more interior walls include a first arched section and a second arched section positioned laterally between the central support structure and the first main opening. A third example of the valve bridge optionally includes one or both of the first and second examples, and further includes wherein the one or more interior walls further include a third arched section and a fourth arched section positioned laterally between the central support structure and the second main opening. A fourth example of the valve bridge optionally includes one or more or each of the first through third examples, and further includes wherein a first exterior end surface of the valve bridge defines a first groove and a second groove, each of the first and second grooves extending laterally along the first exterior end surface from a first side of the valve bridge including the first main opening to a second side of the valve bridge including the second main opening, the first groove positioned longitudinally at the first exterior end surface between the passage and the first arm and the second groove positioned longitudinally at the first exterior end surface between the passage and the second arm. A fifth example of the valve bridge optionally includes one or more or each of the first through fourth examples, and further includes wherein the first groove includes a first orifice extending into the passage between the first arched section and the first main opening and a second orifice extending into the passage between the third arched section and the second main opening, and the second groove includes a third orifice extending into the passage between the second arched section and the first main opening and a fourth orifice extending into the passage between the fourth arched section and the second main opening. A sixth example of the valve bridge optionally includes one or more or each of the first through fifth examples, and further includes a second exterior end surface positioned longitudinally between the first arm and the second arm and opposite to the first exterior end surface, with a first indentation of the first arm and a second indentation of the second arm each terminating at the second exterior end surface. A seventh example of the valve bridge optionally includes one or more or each of the first through sixth examples, and further includes wherein the first main opening opens to the passage at a first exterior side wall and the second main opening opens to the passage at a second exterior side wall, the first exterior side wall laterally opposing the second exterior side wall, with a first open space laterally separating the first arched section and the first exterior side wall and a second open space laterally separating the second arched section and the first exterior side wall. An eighth example of the valve bridge optionally includes one or more or each of the first through seventh examples, and further includes a third open space laterally separating the third arched section and the second exterior side wall and a fourth open space laterally separating the fourth arched section and the second exterior side wall. A ninth example of the valve bridge optionally includes one or more or each of the first through eighth examples, and further includes wherein the first arched section and the third arched section are joined to the central support structure with no lateral open spaces therebetween, and the second arched section and the fourth arched section are joined to the central support structure with no lateral open spaces therebetween. A tenth example of the valve bridge optionally includes one or more or each of the first through ninth examples, and further includes wherein the first arm includes a first recess and the second arm includes a second recess, the first recess and the second recess each adapted to engage with a corresponding valve stem.

In one embodiment, a system comprises: at least a first engine cylinder valve and a second engine cylinder valve; a valve bridge couplable to each of the first and second engine cylinder valves, the valve bridge having an inner surface that defines at least one cavity extending through a thickness of the valve bridge with a wall or separator disposed therein and having at least one opening; and an engine rocker arm couplable to the valve bridge and configured to drive the first and second engine cylinder valves via the valve bridge. In a first example of the system, the valve bridge further comprises a first arm having a first recess and a second arm having a second recess, with the first recess being configured to engage with the first engine cylinder valve and the second recess configured to engage with the second engine cylinder valve. A second example of the system optionally includes the first example, and further includes wherein the wall or separator is centered within the at least one cavity along a lateral axis of the valve bridge, the lateral axis intersecting a midpoint of a first main opening of the at least one cavity and a midpoint of an opposing, second main opening of the at least one cavity. A third example of the system optionally includes one or both of the first and second examples, and further includes wherein the at least one opening of the wall or separator includes only a first opening and a second opening, with a midpoint of the first opening and a midpoint of the second opening each positioned along a vertical axis arranged perpendicular to the lateral axis and intersecting the lateral axis. A fourth example of the system optionally includes one or more or each of the first through third examples, and further includes wherein the valve bridge includes a first exterior surface adapted to engage with the engine rocker arm, with a midpoint of the first exterior surface positioned along the vertical axis. A fifth example of the system optionally includes one or more or each of the first through fourth examples, and further includes wherein the engine rocker arm engages with the first exterior surface at an end of the engine rocker arm In one embodiment, a method for a valve bridge comprises: during operation of an engine including a valve train system: driving the valve bridge via a rocker arm of the valve train system, the rocker arm engaged with a first end of the valve bridge, to simultaneously open two cylinder valves of the valve train system, where the valve bridge includes: two arms, each arm coupled to one of the two cylinder valves; a passage extending through a central portion of the valve bridge, between the two arms; and a central support structure with at least one opening, the central support structure configured to rigidly support movement of the two arms against the two cylinder valves during the driving and reduce a weight of the valve bridge. In a first example of the method, the passage opens to a first exterior side wall of the valve bridge and an opposing, second exterior side wall of the valve bridge, the passage configured to conduct oil between the first exterior side wall and second exterior side wall and through the at least one opening of the central support structure during the driving of the valve bridge. A second example of the method optionally includes the first example, and further includes wherein the passage opens to at least one orifice at a second end of the valve bridge opposite to the first end, the passage configured to conduct oil through the at least one orifice during the driving of the valve bridge.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A valve bridge, comprising:
a first arm and an opposing second arm, and a base of the valve bridge extending along a longitudinal axis which extends between recesses for valve stems;
a first wall and a second wall extending outward from the base of the valve bridge and connecting to one another;
an interior face of each of the first wall, the second wall, and the base of the valve bridge forming a passage extending through the valve bridge, the passage disposed between the first wall and the second wall and the passage extending from a first main opening in a first exterior side wall and an opposing, second main opening in a second exterior side wall;
a central support wall formed within the passage, two openings forming two passages through the central support wall, and the two openings connecting sides of the passage divided by the central support wall; and
orifices extending through the base of the valve bridge to connect the passage to an exterior of the valve bridge.

2. The valve bridge of claim 1, wherein the two openings in the central support wall includes an upper opening spaced from a lower opening by a midsection of the central support wall, the midsection extending longitudinally through the passage.

3. The valve bridge of claim 1, wherein the first and second walls include a first arched section and a second arched section positioned laterally between the central support wall and the first exterior side wall.

4. The valve bridge of claim 3, wherein the first and second walls further include a third arched section and a fourth arched section positioned laterally between the central support wall and the second exterior side wall.

5. The valve bridge of claim 4, wherein an exterior face of the base of the valve bridge defines a first groove and a second groove, each of the first and second grooves extending perpendicular to the longitudinal direction along the exterior face from a first side of the valve bridge including the first main opening to a second side of the valve bridge including the second main opening, the first groove positioned longitudinally at the exterior face between the passage and the first arm and the second groove positioned longitudinally at the exterior face between the passage and the second arm.

6. The valve bridge of claim 5, wherein the first groove includes a first orifice of the orifices extending into the passage between the first arched section and the first main opening and a second orifice of the orifices extending into the passage between the third arched section and the second main opening, and the second groove includes a third orifice of the orifices extending into the passage between the second arched section and the first main opening and a fourth orifice of the orifices extending into the passage between the fourth arched section and the second main opening.

7. The valve bridge of claim 5, further comprising a second exterior end surface positioned longitudinally between the first arm and the second arm and opposite to the exterior face, with a first indentation of the first arm and a second indentation of the second arm each terminating at the second exterior end surface.

8. The valve bridge of claim 4, wherein the first main opening opens to the passage at the first exterior side wall and the second main opening opens to the passage at the second exterior side wall, the first exterior side wall laterally opposing the second exterior side wall, with a first open space laterally separating the first arched section and the first exterior side wall and a second open space laterally separating the second arched section and the first exterior side wall.

9. The valve bridge of claim 8, further comprising a third open space laterally separating the third arched section and the second exterior side wall and a fourth open space laterally separating the fourth arched section and the second exterior side wall.

10. The valve bridge of claim 4, wherein the first arched section and the third arched section delimit the passage and are joined to the central support wall with no lateral open spaces therebetween, and the second arched section and the fourth arched section delimit the passage and are joined to the central support wall with no lateral open spaces therebetween.

11. The valve bridge of claim 1, further comprising open spaces within the interior faces of the first and second walls and connected to the passage.

12. The valve bridge of claim 11, wherein the orifices connect to the open spaces.

13. A system, comprising:
at least a first engine cylinder valve and a second engine cylinder valve;
a valve bridge comprising:
a base of the valve bridge extending along a longitudinal axis which extends between recesses for each of the first and second engine cylinder valves,
a first wall and a second wall extending outward from the base of the valve bridge,
an inner surface that defines a passage extending perpendicular to the longitudinal axis through the valve bridge between exterior openings,
a wall or separator disposed within the passage and two openings forming two passages through the wall or separator, and
orifices extending through the base of the valve bridge to connect the passage to an exterior of the valve bridge; and
an engine rocker arm couplable to the valve bridge and configured to drive the first and second engine cylinder valves via the valve bridge.

14. The system of claim 13, wherein the two openings of the wall or separator includes a first opening and a second opening, and the first and second openings connecting sides of the passage divided by the wall or separator.

15. The system of claim 13, wherein the passage extends between a first and a second exterior wall of the valve bridge.

16. The system of claim 13, wherein open spaces extend into interior faces of the first and second walls, and wherein the orifices connect to the open spaces.

17. A method for a valve bridge, comprising:
during operation of an engine including a valve train system:
driving the valve bridge via a rocker arm of the valve train system, the rocker arm engaged with a first end of the valve bridge, to simultaneously open two cylinder valves of the valve train system, where the valve bridge includes:
a base of the valve bridge, a first arm, and a second arm extending along a longitudinal axis which extends between recesses for the two cylinder valves;
two walls extending outward from the base of the valve bridge and connecting to one another;
a passage extending through a central portion of the valve bridge between exterior openings, between the two walls;
orifices extending through the base of the valve bridge to connect the passage to an exterior of the valve bridge; and
a central support wall within the passage and two openings forming two passages through the central support wall, the central support wall configured to rigidly support movement of the two walls against the two cylinder valves during the driving and reduce a weight of the valve bridge.

18. The method of claim 17, wherein the passage opens to a first exterior side wall of the valve bridge and an opposing, second exterior side wall of the valve bridge, the passage conducting oil between the first exterior side wall and the second exterior side wall and through the two openings of the central support wall during the driving of the valve bridge, and
wherein the orifices conducting oil between the passage to a exterior face of the base of the valve bridge.

19. The method of claim 18, wherein the orifices are positioned within grooves on the exterior face of the base of the valve bridge.

* * * * *